Sept. 28, 1926.

L. A. RATLIFF 1,601,373

AUTOMATIC AIR BRAKE

Filed April 17, 1926

Inventor
Lucious A. Ratliff.

By
Attorneys

Patented Sept. 28, 1926.

1,601,373

UNITED STATES PATENT OFFICE.

LUCIOUS AUBRY RATLIFF, OF BAINBRIDGE, GEORGIA.

AUTOMATIC AIR BRAKE.

Application filed April 17, 1926. Serial No. 102,754.

This invention relates to air brakes. It more particularly relates to an automatic device for operating the air brakes of a train upon the derailment thereof.

An object of the invention is to provide an efficient and effective means for causing the air brakes to operate when the wheels assume abnormal position.

Another object is to provide a means for automatically operating the air brakes of a train under abnormal conditions which may be readily installed on any car of the present types and which is inexpensive to manufacture.

Another object is to provide an automatic device for operating the air brakes of a train which is positive at all times and which will not require replacement or repairs except after the train has been derailed.

Another object is to provide an automatic device for opening the air circuit of the train air pipe line, thereby causing the brakes to operate, and which may be subsequently manipulated to close the said air circuit.

Other objects and advantages will hereinafter appear.

Figure 1:
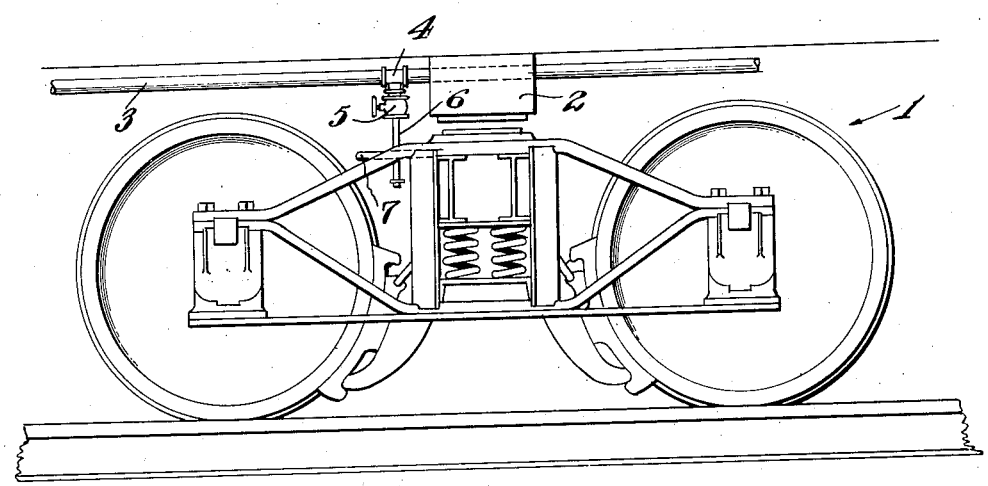
Figure 2:
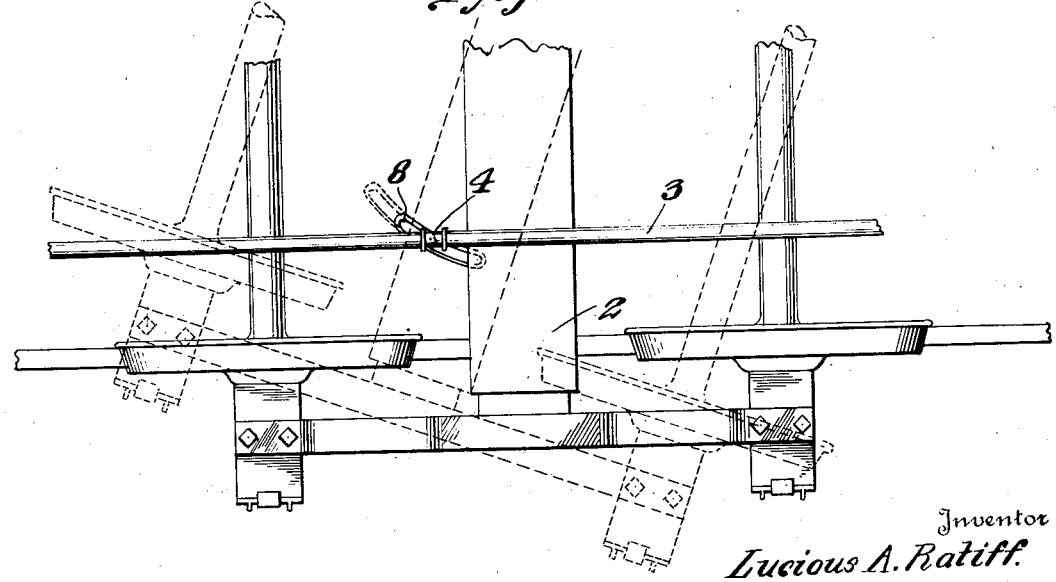

An embodment of the invention is illustrated in the accompanying drawing wherein Figure 1 shows a car truck and a portion of the main air line in side elevation; and Figure 2 shows a top plan view of one side of the truck shown in Figure 1, the full lines indicating the normal position of the truck and the dotted lines indicating an abnormal or derailed position of the truck.

A conventional form of car truck, generally indicated as 1, and I-beam truck bolster 2 is shown. The main air pipe line which controls the brakes, is shown at 3. A T member 4 is connected into the main air pipe line at a point near the bolster 2. This member 4 has a valve member 5 connected therewith, while a nipple member 6 projects downwardly from the valve member.

This nipple member may be formed of any brittle, metallic material which will readily break when pressure is applied thereto. An arcuate member 7 is bolted, welded or otherwise secured to the truck 1. This member is so positioned that the nipple 6 will project therethrough so as to have a sliding movement within the slot 8 formed centrally thereof.

The operation of the device will now be explained. The full lines in Figure 2 show a truck in normal position with the wheels thereof running upon the rails. It will be observed that when the truck is in this position that the member 6 is centrally located within the slot 8 of the member 7. In other words, the member 6 will be allowed a swinging movement in both directions, to the extent of the length of the slot 8. This enables the truck bolster to move as the train proceeds around curves and the like without affecting in any way the usual operation of the air brake system. It should be understood that the greatest curve in any railroad track will not make the truck bolster move more than four inches in either direction and since the members 7 will be formed of an arc approximately ten inches in length, it will be seen that sufficient clearance is provided. In other words, when the nipple member 6 is in the central position of the slot, there will be a space of five inches in both directions through which it may travel.

The dotted lines of Figure 2 show the position that the wheels and bolster assume upon being derailed. In order to cause derailment of the truck, the bolster must of necessity, travel in a circular motion at least five inches in either direction. As soon as this movement in either direction has taken place, the nipple will reach the limit of the slot 8 and will be broken off. As soon as the nipple member 6 is broken off, the air pressure throughout the train air line is released and the brakes immediately applied. After the car has been replaced on the tracks it is not necessary to replace the nipple 6 immediately, if to do so would be impossible or inconvenient. All that is required to be done at such a time is to turn down the valve 5 thus closing off the vent cause in the air line of the train. The brakes may then be released by applying air pressure to the train pipe line.

The device could be placed on only one car of the train or on every car as desired.

Having described a specific embodiment of the invention, the following claims are herewith appended, it being distinctly understood, however, that the invention is susceptible of many variations and adaptations within the scope of the said claims.

1. An automatic safety device for trains comprising a member secured to a car truck, an offset portion in the train air pipe line projecting through said member so as to have limited movement therein when the truck swings during normal movement thereof but adapted to be broken by the member upon abnormal movement thereof.

2. An automatic safety device for trains comprising an arcuate member secured to the bolster of a car truck, a frangible offset portion in the train air pipe line projecting through said member so as to have limited movement therein when the truck swings during normal movement thereof but adapted to be broken by the member upon abnormal movement thereof, whereby the air pipe line pressure is released and the train brakes applied.

3. An automatic safety device for trains comprising an arcuate member having a central slot therein secured to a car truck, an offset portion of the train air pipe line projecting through the slot in said arcuate member, said offset portion adapted to lie centrally of said slot when the train is travelling a straight track, to have a limited movement therein during normal circular movement of the truck as the train proceeds around a curve, and to be broken off thereby when the truck undergoes an abnormal circular movement.

4. An automatic safety device for trains comprising an arcuate member secured to the bolster of a car truck, a frangible offset portion in the train air pipe line projecting through said member so as to have limited movement therein when the truck swings during normal movement thereof but adapted to be broken by the member upon abnormal movement thereof, whereby the air pipe line pressure is released and the train brakes applied, and a valve to close said offset portion so that the air pipe line pressure can be restored.

In testimony whereof I affix my signature.

LUCIOUS A. RATLIFF.